(12) United States Patent
Müller (10) Patent No.: US 10,603,818 B2
(45) Date of Patent: Mar. 31, 2020

(54) METHOD AND APPARATUS FOR PRODUCING A SEWER PIPE ELEMENT

(71) Applicant: BFS BETONFERTIGTEILESYSTEME GMBH, Blaubeuren (DE)

(72) Inventor: Klaus Müller, Blaubeuren (DE)

(73) Assignee: BFS BETONFERTIGTEILSYSTEME GMBH, Blaubeuren (DE)

( * ) Notice: Subject to any disclaimer, the term of this patent is extended or adjusted under 35 U.S.C. 154(b) by 408 days.

(21) Appl. No.: 15/316,946

(22) PCT Filed: Jun. 10, 2015

(86) PCT No.: PCT/EP2015/062982
§ 371 (c)(1),
(2) Date: Dec. 7, 2016

(87) PCT Pub. No.: WO2015/189295
PCT Pub. Date: Dec. 17, 2015

(65) Prior Publication Data
US 2017/0106562 A1 Apr. 20, 2017

(30) Foreign Application Priority Data
Jun. 10, 2014 (DE) .......................... 10 2014 211 030

(51) Int. Cl.
*B28B 19/00* (2006.01)
*F16L 9/08* (2006.01)
(Continued)

(52) U.S. Cl.
CPC .......... *B28B 19/0038* (2013.01); *B28B 21/94* (2013.01); *E03F 3/04* (2013.01);
(Continued)

(58) Field of Classification Search
CPC .................................................. B21C 37/154
See application file for complete search history.

(56) References Cited

U.S. PATENT DOCUMENTS 3,340,115 A * 9/1967 Rubenstein ............. B28B 23/06
156/86
3,742,985 A * 7/1973 Rubenstein ........... B28B 23/046
138/141
(Continued)

FOREIGN PATENT DOCUMENTS

DE 1609170 7/1950
DE 1584483 2/1970
(Continued)

OTHER PUBLICATIONS

DE1584483, English summary of DE1584483, published Feb. 5, 1970.
(Continued)

*Primary Examiner* — Nahida Sultana
(74) *Attorney, Agent, or Firm* — Kilpatrick Townsend & Stockton LLP (57) ABSTRACT

The present invention relates to a method for manufacturing a sewage pipe element comprising a plastics lining, the method comprising the following steps: providing a mould 2 for manufacturing the sewage pipe element, comprising a first sleeve 22 and a plastics element 20; introducing a concrete into the mould 2; attaching a second sleeve 28; demoulding the sewage pipe element; the first sleeve 22 being connected to the plastics element 20 and the plastics element 20 being connected to the second sleeve 28 in a fluid-tight manner in each case and forming at least part of the plastics lining.

8 Claims, 2 Drawing Sheets

(51) Int. Cl.
*F16L 58/18* (2006.01)
*F16L 58/10* (2006.01)
*B28B 21/94* (2006.01)
*E03F 3/04* (2006.01)
*E03F 3/06* (2006.01)
*F16L 21/00* (2006.01)
*F16L 25/00* (2006.01)

(52) U.S. Cl.
CPC ........... *F16L 9/085* (2013.01); *F16L 58/1036* (2013.01); *F16L 58/1081* (2013.01); *F16L 58/185* (2013.01); *E03F 2003/065* (2013.01); *F16L 21/00* (2013.01); *F16L 25/0027* (2013.01)

(56) References Cited

U.S. PATENT DOCUMENTS

| | | | | |
|---|---|---|---|---|
| 5,662,360 A * | 9/1997 | Guzowski | ............ | F16L 37/084 285/110 |
| 7,722,085 B2 * | 5/2010 | Pionetti | ..................... | F16L 1/19 285/55 |
| 2010/0178373 A1 | 7/2010 | Schmidgall et al. | | |
| 2011/0041942 A1 | 2/2011 | Bartlechner et al. | | |
| 2017/0341119 A1 * | 11/2017 | Toguyeni | ............. | B21C 37/154 |

FOREIGN PATENT DOCUMENTS

| | | |
|---|---|---|
| DE | 2165068 | 7/1972 |
| DE | 2855201 | 7/1980 |
| EP | 471319 | 2/1992 |
| EP | 1741532 | 1/2007 |
| EP | 2067590 | 6/2009 |
| JP | S6271614 | 4/1987 |
| WO | 2009112248 | 9/2009 |

OTHER PUBLICATIONS

International Application No. PCT/EP2015/062982, "International Preliminary Report on Patentability," dated Dec. 22, 2016, 13 pages.
German Application No. 10 2014 211 030.0, Search Report dated Mar. 23, 2015.
International Application No. PCT/EP2015/062982, Search Report dated Sep. 10, 2015.
International Application No. PCT/EP2015/062982, Written Opinion dated Sep. 10, 2015.

* cited by examiner

METHOD AND APPARATUS FOR PRODUCING A SEWER PIPE ELEMENT

CROSS REFERENCE TO RELATED APPLICATIONS

This application is a national stage application under 35 U.S.C. § 371 of PCT/EP2015/062982 filed Jun. 10, 2015, which claims priority to German application no. 10 2014 211 030.0 filed Jun. 10, 2014, the disclosures of which are hereby incorporated by reference herein in their entireties.

The present invention relates to a method for manufacturing a sewage pipe element comprising a plastics lining and to a device for manufacturing a sewage pipe element of this type.

Sewage systems comprise pipes, generally manufactured from concrete, which carry wastewater and which are often laid in the ground as part of a sewage system. Access to a sewage system of this type is in many cases provided by entry shafts, which consist of shaft rings arranged above one another and a shaft cone arranged at the top. Sewage pipe elements comprise in particular components of this type (pipes, shaft rings or shaft cones) of a sewage system.

The wastewater carried in a sewage system and the gases arising from the wastewater in many cases lead to corrosion of unprotected sewage pipe elements.

It is known to provide sewage pipe elements with a plastics lining so as to increase the corrosion resistance of the sewage pipe element and improve the flow properties of the carried fluids.

EP 1 741 532 B1 discloses a method in which a plastics material is sprayed directly onto an element of a mould for forming a concrete element used in a sewage system, the mould subsequently being filled with concrete. In this method, however, it is necessary to provide portions of the mould with a plastics layer in an additional method step, and this increases the time required and thus the costs of manufacturing the concrete element.

Furthermore, EP 2 067 590 A2 discloses a method for manufacturing a sewage pipe element comprising a plastics lining in which a concrete pipe is initially produced in a shell construction comprising an outer shell and an inner shell. In a following method step, after the inner shell is removed least in part, a plastics inner pipe is introduced into the first pipe, which has not yet fully set. Thus, this method also comprises an additional step so as to provide the plastics lining, as a result of which the manufacturing method for the sewage pipe element is more complex and longer, and this again increases the manufacturing costs.

A first object of the present invention is to provide a method for manufacturing a sewage pipe element comprising a plastics lining which is cost-effective to carry out.

A second object of the present invention is to provide a sewage pipe element comprising a plastics lining which can be manufactured cost-effectively.

Furthermore, a third object of the present invention is to provide a device for manufacturing a sewage pipe element comprising a plastics lining by means of which sewage pipe elements comprising a plastics lining can be manufactured cost-effectively.

In a first aspect of the present invention, the aforementioned first object is achieved by a method for manufacturing a sewage pipe element comprising a plastics lining, the method comprising the following steps: (a) providing a mould comprising an outer shell and an inner shell, a mould cavity defined between the outer shell and the inner shell defining a cylindrical sewage pipe element which has a receiving portion at one axial end and a plug-in portion at the opposite axial end, an internal cross section dimension of the receiving portion being greater than or equal to an external cross section dimension of the plug-in portion, in such a way that for axially coupling two adjacent sewage pipe elements the plug-in portion of one sewage pipe element can be inserted so as to fit into the receiving portion of the adjacent sewage pipe element, the inner shell being formed from plastics material and comprising a first shell portion which defines the inner wall of the receiving portion, comprising a second shell portion which defines the outer wall of the plug-in portion, and comprising a third shell portion which defines the inner wall of a pipe portion, extending axially between the receiving portion and the plug-in portion, of the sewage pipe element, (b) introducing a concrete into the mould, and (c) demoulding the outer mould, the inner shell remaining connected to the concrete after the concrete sets and forming the plastics lining of the finished sewage pipe element.

According to an important feature of the invention according to the first aspect, the inner shell of the mould forms the plastics lining of the finished sewage pipe element after the concrete sets. The inner shell can thus be used simultaneously both as a shell component and as part of the finished sewage pipe element, in such a way that the mould is of a simpler construction. Moreover, a step of demoulding an inner wall of the sewage pipe element can be omitted, since the inner shell remains on the sewage pipe element.

In a preferred embodiment of the invention, in the step of providing the mould, the inner shell is positioned in line with a vertical cylinder axis in such a way that concrete can be poured in in the axial direction in particular from above and reliably fills out the mould cavity. If in particular the receiving portion points upwards, this further facilitates pouring in the concrete. Particularly preferably, it is conceivable that, in the step of introducing the concrete, the concrete is introduced into the mould cavity through a radial space between the first shell portion (which defines the inner wall of the receiving portion) and the outer shell of the mould. The particular advantage of this variant is that in this region of the radial space between the first shell portion and the outer shell a continuous plastics lining is not absolutely necessary, since this region is not exposed towards the interior of the sewer after the adjacent sewage pipe elements are plugged together, and thus the moisture protection of the plastics lining is not absolutely necessary in this portion.

Preferably, the third shell portion is a statically self-supporting pipe portion, in such a way that it can stand substantially freely without additional auxiliary means or support constructions in the interior of the outer shell or can be suspended or braced in some other way without major outlay.

In a further preferred embodiment of the invention, the first shell portion may be formed by a receiving sleeve separate from the third shell portion and/or the second shell portion may be formed by a plug-in sleeve separate from the third shell portion, in this case the receiving sleeve and the plug-in sleeve each being attached to an associated axial end of the third shell portion in a fluid-tight manner. By manufacturing at least two shell portions out of the first, second and third shell portion separately, the manufacture of the inner shell can be simplified. In particular, the third shell portion may particularly cost-effectively be manufactured as a simple cylindrical pipe without any changes in shape at the axial ends. The fluid-tight attachment between the shell portions can be provided by gluing and/or welding and/or inserting a seal and/or by press fit.

A simple, easily demouldable construction of the mould is further achieved in that preferably a radially outermost circumferential edge of the second shell portion touches the outer shell. The outer wall, lined with plastics material, of the plug-in portion is thus directly adjacent to the outer wall of the sewage pipe element, the second shell portion being readily separable from the outer shell together with the sewage pipe element when the sewage pipe element is demoulded. Particularly preferably, the radially outermost circumferential edge of the second shell portion is positioned against a cylindrical inner wall of the outer shell, in such a way that when the concrete is poured in, the second shell portion is pressed against the inner wall of the outer shell by the pressure of the concrete, and a sufficiently tight connection is provided at this point.

In a second aspect of the invention, the aforementioned third object of the present invention is achieved by a device for manufacturing a sewage pipe element according to any of claims 7 to 11. By means of a device of this type, the advantages and effects disclosed above in relation to the corresponding method are achieved.

In a third aspect of the invention, the first object of the present invention is achieved by a method for manufacturing a sewage pipe element comprising a plastics lining, the method comprising the following steps: providing a mould for manufacturing the sewage pipe element, comprising a first sleeve and a plastics element; introducing a concrete into the mould; attaching a second sleeve; demoulding the sewage pipe element; the first sleeve being connected to the plastics element and the plastics element being connected to the second sleeve in a fluid-tight manner in each case, and forming at least part of the plastics lining. The plastics element and the first sleeve each perform a dual function as part of the mould and as part of the plastics lining, making it possible to save on parts of the mould, reducing the manufacturing costs. Furthermore, the fluid-tight connection of the first sleeve to the plastics element and of the plastics element to the second sleeve provides that these elements of the plastics lining are connected in such a way that the concrete of the sewage pipe element is protected, at the connection points, against wastewater and against gases arising from the wastewater (or generally from fluids located in the sewage pipe element). The plastics element is preferably formed separately from the first sleeve before the step of providing the mould. The plastics element is preferably formed separately from the second sleeve before the step of providing the mould. The first sleeve is preferably formed separately from the second sleeve before the step of providing the mould. The first and/or second sleeve are preferably formed from a plastics material. The mould may comprise an outer shell. The mould may comprise an inner shell, which preferably comprises the plastics element. The concrete is preferably introduced into the mould by means of a concrete introduction device. In the method, an arrangement for fixing the inner shell relative to the outer shell may be provided. When the second sleeve is attached, the second sleeve is preferably attached to the concrete of the sewage pipe element which is not yet finished, the concrete preferably being set at least in part, particularly preferably not being set or optionally being set. The second sleeve may be fixed securely during the setting of the concrete by contraction of the concrete around the second sleeve and/or in the second sleeve. However, it is preferred to glue the second sleeve to the concrete of the sewage pipe element which is not yet finished, the concrete possibly not being set, preferably being at least partially set, particularly preferably being set. If the second sleeve is glued as disclosed above, in particular in a step of gluing to the concrete it may also be glued to the plastics element. In a possible embodiment, however, the second sleeve may be attached exclusively to the plastics element by gluing and/or welding and/or a positive and/or non-positive connection.

The plastics element is preferably formed as a pipe, the pipe preferably having a substantially constant cross section perpendicular to an axial direction of the pipe. In particular, the pipe may have a purely cylindrical shape, which has a constant circle shape as a cross section perpendicular to an axial direction of the pipe. However, pipes are also conceivable which respectively have a substantially constant ellipse shape, egg shape or mouth shape as a cross section perpendicular to an axial direction of the pipe. Pipes of this type may be provided in a simple and cost-effective manner, for example in an extruding step, formation of moulded parts such as connections and/or sleeves, which is associated with complex manufacture of a pipe (or plastics element), not taking place. Pipes which have a substantially constant cross section perpendicular to an axial direction of the pipe may not only be pipes in which a circle shape, an ellipse shape, an egg shape, a mouth shape or a similar shape varies as a result of production tolerances, but in particular also pipes in which the cross section varies perpendicular to an axial direction of the pipe so as to influence the flow properties.

Polyureas, polyurethanes, in particular thermoplastic polyurethanes or cross-linked polyurethanes, polyolefins, polyvinylchloride or polyamides may be used as the material of the plastics element and/or of the first sleeve and/or of the second sleeve.

In the method, the first sleeve and/or the plastics element may be self-supporting. The self-supporting first sleeve and/or the self-supporting plastics element can thus be provided when providing the mould, without separate steps, for example as part of an inner shell, in particular without a step of providing a bracing device, for example a mould core, meaning that the method proceeds in a particularly simple and thus cost-effective manner. The second sleeve may also be self-supporting; in particular, if the second sleeve is attached to concrete which is still deformable, a support arrangement supporting the shape of the second sleeve can be omitted.

In the context of the present application, a self-supporting plastics element or a self-supporting sleeve means an element (plastics element or sleeve) which substantially maintains the shape thereof without the use of a support arrangement and/or bracing device during use as intended. In particular, a vertical or horizontal self-supporting element should not collapse under its own weight. Preferably, self-supporting elements substantially maintain the shape thereof under the pressure of the concrete during introduction and/or during the setting of the concrete; for this purpose, it may be necessary to introduce the concrete carefully and uniformly, in such a way that a uniform pressure distribution is provided during the introduction of the concrete onto the element. For this purpose, the concrete is preferably introduced in such a way that, during the introduction, a level of the introduced concrete in the mould rises uniformly substantially throughout the mould.

It is possible for the first sleeve, the plastics element and the second sleeve to be rigidly connected to the concrete after the step of at least partially setting the concrete. For this purpose, projections or anchors, which can protrude into the concrete, may be provided on the first sleeve, the plastics element or the second sleeve. Alternatively or additionally, an adhesion promotion layer such as an adhesive layer or an adhesive film may be provided on the first sleeve, the plastics element or the second sleeve. As a result of the rigid connection, any deformation of the first sleeve, plastics element or second sleeve which might occur over time as a result of stress or aging processes is prevented.

In a preferred embodiment, the method comprises the following steps, in the sequence as per the numbering: 1) providing the mould for manufacturing the sewage pipe element, comprising the first sleeve and the plastics element, the mould further comprising at least parts of an outer shell, and the first sleeve being connected to the plastics element in a fluid-tight manner; 2) arranging an end insert on the mould; 3) introducing a concrete into the mould; 4) demoulding the sewage pipe element; 5) attaching the second sleeve, the plastics element being connected to the second sleeve in a fluid-tight manner. Because the second sleeve is attached after the step of demoulding the sewage pipe element, this can be carried out in a particularly simple manner without obstruction from mould parts still located on the sewage pipe element. The mould may comprise the entire outer shell in step 1).

Alternatively, steps 1) to 3) in the above sequence may be followed by the following steps, in the sequence 4'), 5'), 6'): 4') removing the end insert; 5') attaching the second sleeve, the plastics element being connected to the second sleeve in a fluid-tight manner; and 6') demoulding the sewage pipe element. Preferably, between steps 3) and 4') the method comprises a step of at least partially setting the concrete; complete setting in this step is possible but is not preferred. Because the (still unfinished) sewage pipe element is demoulded in part, the second sleeve can be attached or inserted and connected to the plastics element in a fluid-tight manner whilst the non-demoulded part of the mould protects the still unfinished sewage pipe element from damage during this process, reducing the waste during manufacture and thus the manufacturing costs. In the possible case where the concrete is not yet set, attaching the second sleeve to the concrete of the still unfinished sewage pipe element makes possible a particularly reliable connection of the second sleeve to the concrete, since the concrete can contract around the second sleeve and/or in the second sleeve during setting. As disclosed above, in a preferred embodiment, the second sleeve can be attached (step 5) or step 5')) by gluing.

In the method, the step of providing the mould for manufacturing the sewage pipe element may comprise providing an end insert. Providing an end insert makes it possible, in a simple and thus cost-effective manner, to provide a desired shaping of an end of the sewage pipe element. Thus, the end insert may comprise a negative shape of an end of a concrete portion of the sewage pipe element. Furthermore, the end insert may be removed during a step of demoulding in part. It is possible, preferably after the step of demoulding in part, to attach the second sleeve to the end of the concrete portion of the sewage pipe element from which the end insert is removed.

In the method, it is preferred for the first sleeve, the plastics element and preferably at least part of the end insert to form the inner shell of the mould. Thus, the majority of the inner shell remains in the sewage pipe element, in such a way that a step of demoulding the sewage pipe element proceeds in a particularly simple and rapid manner.

The mould preferably further comprises an outer shell and optionally the second sleeve.

It is possible for the end insert to comprise at least one opening for introducing the concrete. As a result, the end insert may have a dual function; it may be used for shaping the sewage pipe element and simultaneously be formed as an insertion aid for introducing the concrete into the mould.

The mould used in the method, for manufacturing the sewage pipe element, may comprise an outer shell which comprises at least part of the end insert. Thus, a complicated portion of the outer wall of the sewage pipe element can be formed with the assistance of an end insert which is preferably separate from the remainder of the outer shell, it being possible to remove the end insert in a particularly simple manner during demoulding or during demoulding in part, since the lighter end insert can be released from a complicated structure formed of concrete in a simpler manner than a single-piece outer shell without damaging the structure. This also reduces the proportion of waste and thus the costs during manufacture.

Preferably, in the method, the first sleeve is connected to the plastics material and/or the plastics element is connected to the second sleeve in a fluid-tight manner using a sealing element, by welding or by gluing. These well-known methods provide a reliable and cost-effective option for forming a fluid-tight connection between the first sleeve and the plastics element and/or the plastics element and the second sleeve.

In the context of the present application, a sealing element is intended to mean in particular a seal, a sealant or a sealing arrangement. A sealing arrangement may comprise a pipe, an inner or outer sleeve or a sheath which has self-sealing properties or is provided with one or more seals or with sealant.

In the method, the first sleeve may be provided or the second sleeve may be attached in such a way that the first sleeve or the second sleeve lines an abutting face of a sewage pipe element to be manufactured, at least in portions, preferably completely. Thus, the plastics lining, part of which is the first sleeve or the second sleeve as applicable, extends as far as the abutting face of the sewage pipe element and lines this at least in portions, making it possible to line the entire sewage pipe element apart from the abutting face thereof with plastics material, making the sewage pipe element particularly tight. Furthermore, a lining on an abutting face makes it possible to provide an area which, as a result of the surface constitution thereof, is particularly suitable for being sealed off from a further sewage pipe element.

An abutting face of a sewage pipe element means an area which, when the sewage pipe element is laid, is directly adjacent to a further sewage pipe element, for example an abutting face of the further sewage pipe element, it being possible for a sealing element to be arranged between the abutting face of the sewage pipe element and the further sewage pipe element.

In the method, it is conceivable for the first sleeve and the plastics element to be provided in such a way and for the second sleeve to be attached in such a way that the first sleeve, the plastics element and the second sleeve completely line an inner face of a sewage pipe element to be manufactured. As a result, the plastics lining may be formed as part of the inner shell, meaning that the plastics lining is provided in a particularly simple and thus cost-effective manner. In particular, the entire plastics lining may be formed from elements of the mould, for example from elements of an inner shell of the mould, preferably from the plastics element and from the first sleeve, optionally from a sealing element or from a plurality of sealing elements, and from the second sleeve.

In the method, it is possible for the first sleeve to be provided and/or for the second sleeve to be attached in such a way that the first sleeve and/or the second sleeve lines an outer face of a sewage pipe element to be manufactured at least in part. On the portions of the outer face lined by the first and/or second sleeve, the lining provides protection against damage. In a particularly preferred embodiment, edges or an edge present on the sewage pipe element to be manufactured, for example an edge at a transition of an abutting face and an outer face of the sewage pipe element to be manufactured and/or an edge at a transition of an abutting face and an inner face of the sewage pipe element to be manufactured, are lined by the first and/or second sleeve, providing edge protection for these edges. This reduces the waste during transport and during laying.

The method may further comprise a step of arranging a sealing element on the first sleeve and/or on the second sleeve. As a result, a particularly tight connection of the sewage pipe element to be manufactured to a further sewage pipe element can be formed.

The mould used in the method for manufacturing the sewage pipe element may comprise a region for forming at least one transport portion of the sewage pipe element. If the mould forms a transport portion of the sewage pipe element, the sewage pipe elements can be transported in a particularly simple manner, for example on a construction site.

A sewage pipe element manufactured by one of the above-disclosed methods achieves the second object of the present invention, since the method for manufacturing the sewage pipe element proceeds in a particularly cost-effective manner.

In a fourth aspect of the invention, the third object of the present invention is achieved by a device for manufacturing a sewage pipe element comprising a plastics lining, preferably by a method of the above-disclosed type, comprising: a mould for manufacturing the sewage pipe element, which comprises a reusable outer shell, an inner shell, a first sleeve and a second sleeve, the inner shell comprising a plastics element for one-time use in manufacturing the sewage pipe element, the first sleeve and the second sleeve being provided for one-time used in manufacturing the sewage pipe element, and the first sleeve, the second sleeve and the plastics element each being set up to be permanently connected to the sewage pipe element to be manufactured; a concrete introduction device for introducing concrete into the mould; and an arrangement for fixing the inner shell relative to the outer shell. As a result of the use of parts of the mould which are intended for one-time use and which have a dual function as part of the mould and as part of the sewage pipe element to be manufactured, sewage pipe elements can be manufactured in a cost-effective manner.

The device may further comprise a device for connecting the second sleeve to the plastics element. As a result, the step of connecting the second sleeve to the plastics element can be carried out particularly reliably and rapidly.

The mould used in the device may be formed to receive the second sleeve. As a result, the second sleeve can be guided by the mould, meaning that the second sleeve can be placed particularly reliably at the desired point on the concrete of the sewage pipe element to be manufactured.

The features of the mould, the plastics element and the first and/or second sleeve may be features of the device.

In the following, the invention is described in greater detail by way of embodiments with reference to the accompanying drawings, in which.

FIRST EMBODIMENT OF THE PRESENT INVENTION

Figure 1:
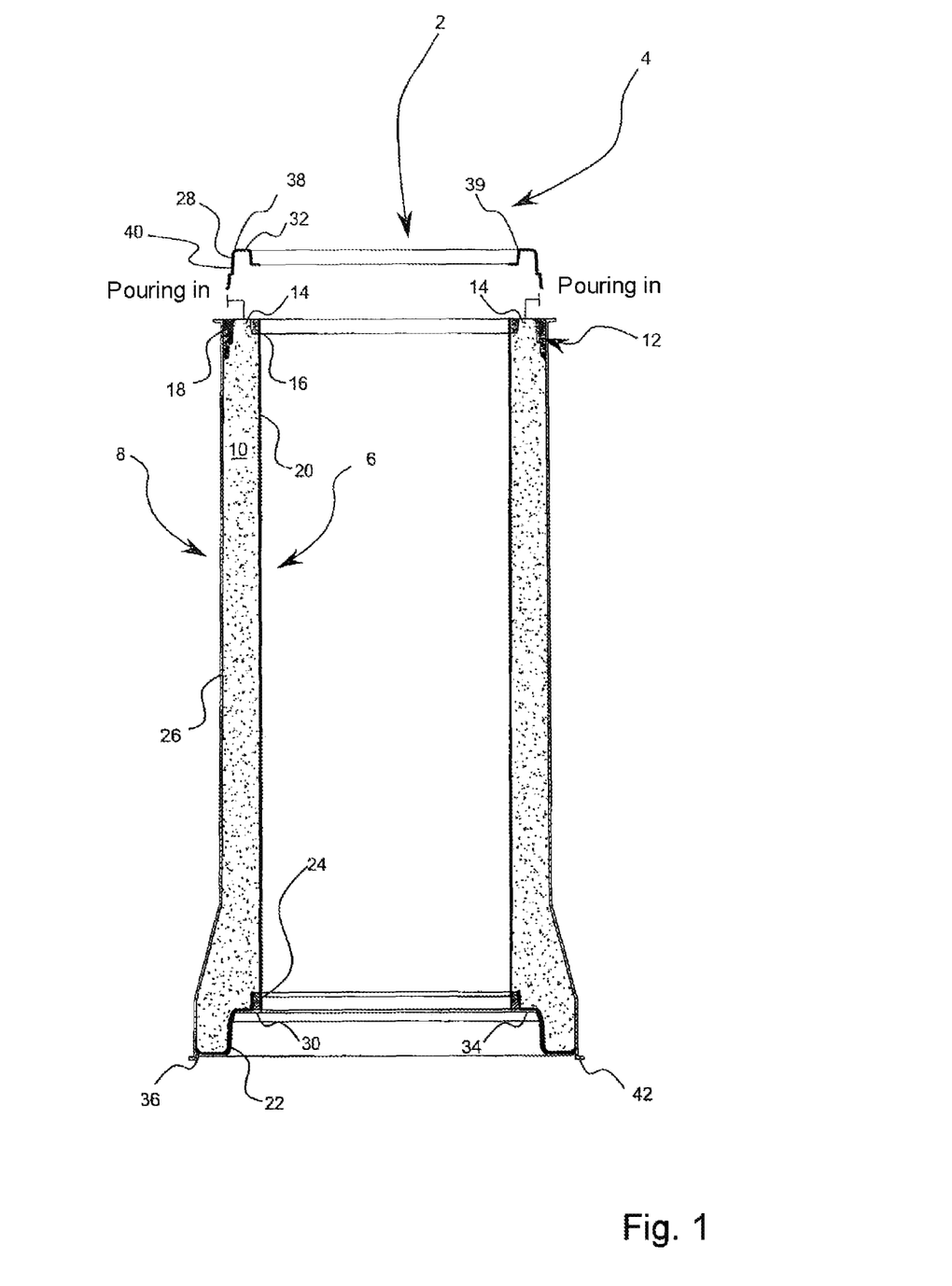
FIG. 1 is a schematic sectional view of a mould of a device according to the invention for manufacturing a sewage pipe element comprising a plastics lining in accordance with a first embodiment.

FIG. 1 is a schematic sectional view of a mould 2 of a device 4 for manufacturing a sewage pipe element comprising a plastics lining in accordance with a first embodiment of the present invention. The device 4 comprises a concrete introduction device (not shown) for introducing concrete into the mould 2. The mould 2 comprises an inner shell 6 and a reusable outer shell 8. The outer shell 8 is preferably formed from metal, for example steel or high-grade steel, or at least comprises sub-elements formed from metal, for example steel or high-grade steel. The inner shell 6 and the outer shell 8 define a mould interior 10 for receiving concrete. The mould 2 may comprise an end insert 12, which preferably comprises at least one opening 14, particularly preferably a plurality of openings 14, for introducing the concrete. The end insert 12 may preferably comprise an inner ring element 16 and an outer ring element 18. The inner ring element 16 may be connected to the outer ring element 18 by at least one web (not shown), preferably a plurality of webs. The at least one opening 14 is preferably formed between the inner ring element 16 and the outer ring element 18, it being possible for a plurality of openings 14 to be formed between the inner ring element 16 and the outer ring element 18. The inner shell 6 preferably comprises a plastics element 20 and a first sleeve 22. The plastics element 20 and the first sleeve 22 are interconnected in a fluid-tight manner. This can be achieved by providing a sealing element, preferably a seal 24, between the first sleeve 22 and the plastics element 20; however, the first sleeve 22 and the plastics element 20 may also be connected in a fluid-tight manner by welding or gluing. The plastics element 20 is preferably formed from a self-supporting pipe.

Preferably, the plastics element 20 and/or the first sleeve 22 are formed in a self-supporting manner, in such a way that they preferably withstand the pressure of the concrete poured into the mould interior 10 during the manufacture of the sewage pipe element without the shape of these self-supporting elements substantially changing. The first sleeve 22, the plastics element 20 and the inner ring element 16 of the end insert 12 preferably form the inner shell 6 of the mould 2. The outer shell 8 preferably comprises the outer casing 26 and the outer ring element 18 as part of the end insert 12.

It should be noted that the first sleeve 22 and the plastics element 20 form part of the plastics lining of the finished sewage pipe element, and are thus rigidly and permanently connected to the finished sewage pipe element. For this purpose, the first sleeve 22, the plastics element 20 and the second sleeve 28 (disclosed in greater detail below) may comprise anchors, elevations or an adhesion promotion layer (glue, resin or the like) on a face facing the concrete of the sewage pipe element.

Once the concrete has been introduced into the mould interior 10, if an end insert 12 is present it is possible to wait until the concrete is cured at least in part, and subsequently the end insert 12 can be removed and the second sleeve 28 can be inserted in its place. The second sleeve 28 may be placed on the partially set concrete, in such a way that, when the partially set concrete sets, the concrete body of the sewage pipe element contracts and thus fixes the second sleeve 28 with respect to the concrete body. However, it is also possible for the elevations or anchors which are preferably provided in the second sleeve 28 to penetrate into the concrete, and thus to fix the second sleeve 28 with respect to the concrete after the concrete sets. The second sleeve 28 may be part of the mould 2, since the second sleeve 28 can assist in particular in the shaping of the partially set and/or still deformable concrete.

The transition between the second sleeve 28 and the plastics element 20 is connected in a fluid-tight manner. This may be achieved for example by providing a sealing element (not shown), preferably a seal. However, it is also possible to weld or glue the second sleeve 28 to the plastics element 20 in a fluid-tight manner. The first and/or second sleeve 22, 28 may be manufactured from plastics material; however, metal or ceramics may also be used as the material of the sleeves.

To prevent the sealing element formed for example as a seal 24 from slipping out during the introduction of the concrete into the mould interior 10, the first sleeve 22 may optionally have a support face 30 (shown in the schematic FIG. 1 as a hatched optional face or optional overhang of the first sleeve 22), on which the sealing element, in this case the seal 24, can be braced against the pressure of the concrete from the mould interior 10. The face 32 of the second sleeve 28 or the face 34 of the first sleeve 22 may line an abutting face of a manufactured sewage pipe element, preferably completely, as shown, but also optionally in portions. The abutting faces may thus be lined by portions of the first or second sleeve. On the one hand, this makes the abutting face less sensitive to contact with sharp-edged items than a pure concrete face; on the other hand, the sleeve can be formed particularly smoothly at the point where it lines the abutting face, in such a way that it is particularly well set up to cooperate with a sealing element so as to seal off the sewage pipe element from a further sewage pipe element.

If the second sleeve 28 is only arranged after the concrete sets, the second sleeve 28 may for example be fixed to the concrete by means of glue or an adhesive film. However, it is also possible to treat the second sleeve 28 thermally, by means of radiation, or chemically, and to use a preferably associated shrinking or deformation for fixing to the concrete. If the second sleeve 28 is arranged and connected to the plastics element 20 in a fluid-tight manner, the first sleeve 22, the second sleeve 28 and the plastics element 20 may, as shown in FIG. 1, completely line the inner face of the sewage pipe element to be manufactured.

As is shown in FIG. 1, the first sleeve 22 comprises a region 36 which lines an outer edge of an end of the pipe to be manufactured, and the second sleeve 28 comprises a region 38 and a region 39, which respectively line edges of the abutting face 32 at a transition of the abutting face 32 into an inner face and an outer face of the sewage pipe element to be manufactured. Furthermore, the second sleeve 28 comprises a region 40 which lines an outer face of a sewage pipe element to be manufactured at least in portions. These regions 36 to 40 of the first and second sleeve serve to protect edges or the concrete positioned below.

In particular, a sealing element may be arranged on the abutting faces 30, 32, but also on the face lined by the portion 40, so as to seal off the sewage pipe element from an adjacent sewage pipe element. In particular, a sealing element may be arranged on the first and/or on the second sleeve. It is preferably arranged in a captive manner, for example by gluing or by arranging the sealing element on the first and/or on the second sleeve on or in a groove (not shown).

So as to be able to transport the sewage pipe element well, the mould for manufacturing the sewage pipe element may comprise a region for forming at least one transport portion of the sewage pipe element. A transport portion of this type may be a depression or an overhang; however, it is also possible to provide a mounting for a metal eye or the like, which is rigidly connected to the sewage pipe element after the concrete of the sewage pipe element sets, on the outer shell 8.

The mould 2 is fixed in the device 4, for example on a casting table, by means of mounting portions 42 of the outer shell 8 and a centring apparatus (not shown) for orientating the plastics element 20 and/or the first sleeve 22. As a result, the outer shell 8 can be fixed relative to the inner shell 6. However, it is also possible to fix the inner shell 6 relative to the outer shell 8 by fixing the outer casing 26, which is part of the outer shell 8, and the first sleeve 22, which is preferably part of the inner shell 6, relative to one another by way of a positive connection or non-positive connection when providing the mould 2. For example, a projection on the outer casing 26 may engage in a recess on the first sleeve 22; alternatively or additionally, a corresponding projection on the first sleeve 22 may also engage in a recess on the outer casing 26 (in each case not shown in FIG. 1). An arrangement which forms a positive connection or a non-positive connection may also be considered an arrangement for fixing the inner shell 6 relative to the outer shell 8.

Once the end insert 12 has been removed, the mould 2 can receive the second sleeve 28. However, it is also conceivable to fill the mould interior 10 with concrete without providing an end insert 12, in which case the second sleeve 28 may, in an embodiment not shown, be placed for example as an annular element on the face of the concrete. However, it is also possible to press the second sleeve 28 into the still deformable concrete in the mould interior 10. The second sleeve 28 is preferably arranged with the assistance of a device, for example a press, for arrangement of precisely this sleeve.

Furthermore, the device 4 may comprise a device for connecting the second sleeve 28 to the plastics element 20. This may be a device which in a finished sewage pipe element spreads a glue on faces, which are glued together, of the plastics element 20 and/or of the second sleeve 28. However, it is also possible for only one of these faces to be provided with a glue. However, it is also possible for the device for connecting the second sleeve 28 to the plastics element 20 to be a device for welding the second sleeve 28 to the plastics element 20, this device for connecting preferably supplying a material for the weld seam during connection. A device of this type of the device 4 or this device can be used to connect the first sleeve 22 to the plastics element 20.

EMBODIMENT OF A METHOD ACCORDING TO THE PRESENT INVENTION

A method for manufacturing a sewage pipe element comprising a plastics lining in accordance with a second embodiment of the present invention is disclosed in the following.

Preferably, for the present method, the device of the first embodiment for manufacturing a sewage pipe element comprising a plastics lining is used. In particular, in the method, isolated elements of the device 4 may be provided; equally, properties of the mould 2, of the device 4, of the plastics element 20, of the first sleeve 22 or of the second sleeve 28 may be used or exploited for the method.

In a particularly preferred embodiment, the steps of the method numbered in the following are carried out in the sequence as per the numbering. However, it is also possible to change the sequence of the steps. It is preferred for a step having a lower number to be carried out before a step having a higher number. It is possible not to carry out optional steps. Preferably, one of the steps is completed before another step is carried out.

1) In a preferably first step, a mould 2 for manufacturing the sewage pipe element is provided, which comprises a first sleeve 22 and a plastics element 20. The mould 2 may, preferably in the first step, comprise at least parts of an outer shell 8 and/or inner shell 6.

2) In a preferably second step, the first sleeve 22 is connected to the plastics element 20 in a fluid-tight manner, it being possible for this step to be part of the $1^{st}$ step. Preferably, for this purpose a device as disclosed in the first embodiment of the present invention is used.

During the fluid-tight connection of the first sleeve 22 to the plastics element 20, a sealing element, in the embodiment a seal 24, may be provided between the plastics element 20 and the first sleeve 22; however, it is also possible to glue or weld the plastics element 20 and the first sleeve 22 together in a fluid-tight manner.

3) Optionally, in a third step, an end insert 12 may be arranged on the mould 2.

4) In a fourth step, concrete is introduced into the mould 2.

5) Optionally, in a fifth step, the concrete introduced into the mould 2 may partially or completely set.

6) Optionally, in a sixth step, the sewage pipe element (not yet finished) may be demoulded in part or demoulded, it being possible to remove in particular the end insert 12 from the mould 2.

If the sewage pipe element is demoulded, preferably only the outer casing 26 and the end insert 12 are removed for this purpose, since the inner shell 6 has substantially become part of the manufactured sewage pipe element (in a preferred embodiment, if present, the optional end insert 12 along with the inner ring element 16 and outer ring element 18 thereof may not be part of the inner shell 6).

7) In a seventh step of the method, the second sleeve 28, preferably as part of the mould, is attached to an intermediate product of the sewage pipe element to be manufactured (for example to the concrete of the still unfinished sewage pipe element) during the manufacturing process. In particular, in the seventh step, the second sleeve 28 may be connected to the plastics element 20 in a fluid-tight manner. However, the fluid-tight connection of the second sleeve 28 to the plastics element 20 may also be carried out in a subsequent step.

In particular, the fluid-tight connection of the second sleeve 28 to the plastics element 20 may be provided by a sealing element (not shown), for example a seal, between the plastics element 20 and the second sleeve 28; however, it is also possible to glue or weld the plastics element 20 and the second sleeve 28 together in a fluid-tight manner.

8) In an eighth step of the method, if step 6) has not yet taken place, the sewage pipe element can be demoulded, for which purpose preferably only the outer casing 26 has to be removed, since the inner shell 6 has substantially completely (compare step 6)) become part of the manufactured sewage pipe element.

SECOND EMBODIMENT OF THE PRESENT INVENTION

Figure 2:
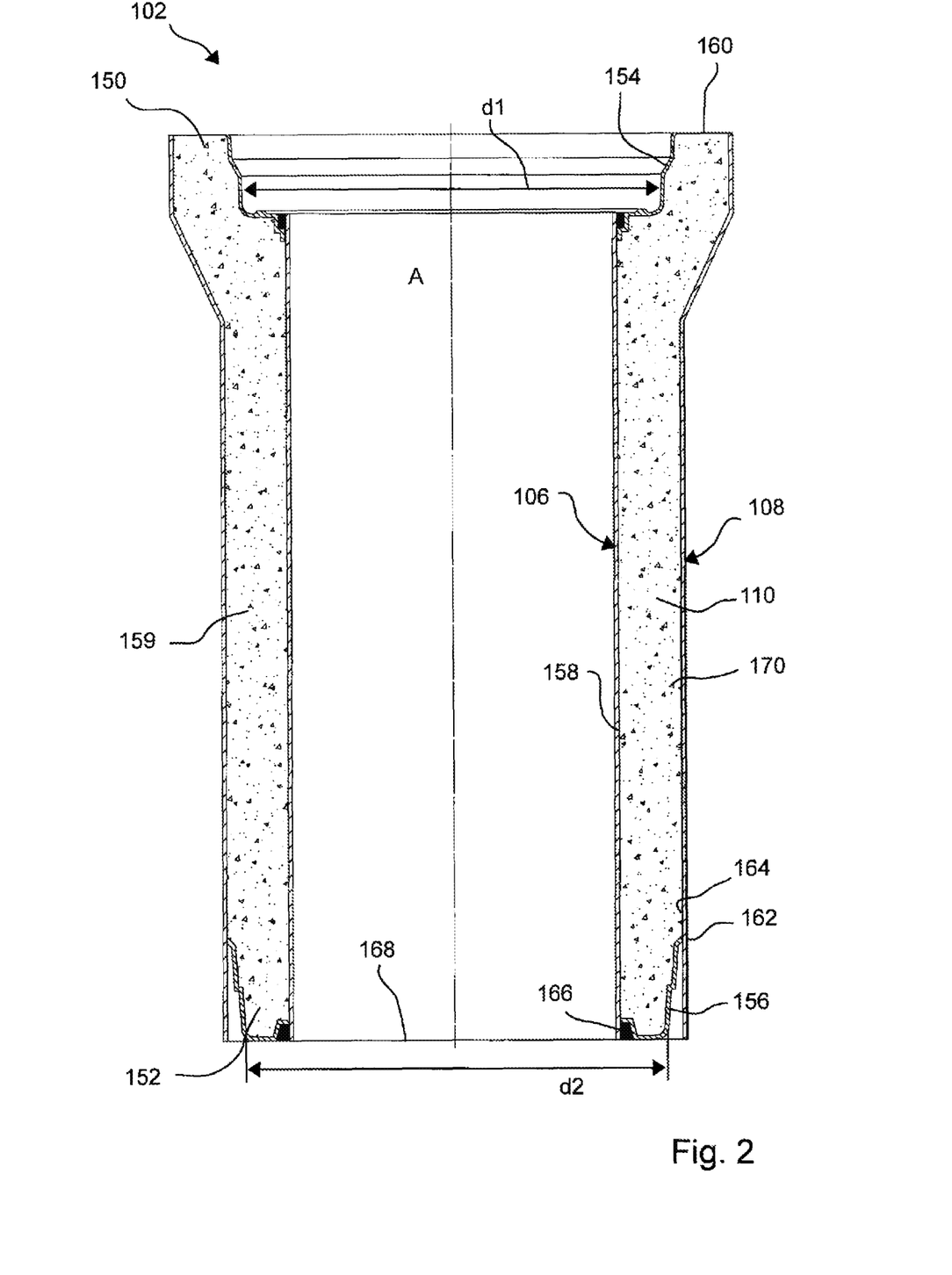
FIG. 2 is a schematic sectional view of a mould of a device according to the invention for manufacturing a sewage pipe element comprising a plastics lining in accordance with a second embodiment.

Referring to FIG. 2, in the following a device and a method for manufacturing a sewage pipe element comprising a plastics lining according to the second embodiment are disclosed. In the following, only the differences from the device and method of the first embodiment are discussed in detail, and otherwise reference is made to the description of the first embodiment.

The mould 102 shown in FIG. 2 comprises an outer shell 108 and an inner shell 106, a mould cavity 110 of a cylindrical sewage pipe element, which has a receiving portion 150 at an upper axial end and a plug-in portion 152 at the opposite axial end, being defined between the outer shell 108 and the inner shell 106. The receiving portion 150 and plug-in portion 152 are formed in such a way that they can be plugged into one another when a plurality of sewage pipe elements are coupled together in the axial direction. For this purpose, in particular an internal cross section dimension d1, in the case of a cylindrical sewage pipe element an internal diameter d1, of the receiving portion 150 is greater than or equal to a corresponding external cross section dimension d2, in the case of a cylindrical sewage pipe element an external diameter d2, of the plug-in portion 152. If two adjacent sewage pipe elements are coupled together axially, the plug-in portion 152 of one sewage pipe element fits precisely into the receiving portion 150 of the other sewage pipe element, in such a way that the two sewage pipe elements can be slid a distance into one another in the axial direction and are held in a fluid-tight manner with respect to one another.

As can be seen in the present embodiment in FIG. 2, the above-disclosed configuration of the receiving portion and matching plug-in portion may be formed by an expanded or bell-shaped receiving portion 150 and a matching or tapered plug-in portion 152. Alternatively, it would be conceivable to taper the plug-in portion 152 to such an extent that it fits into an unexpanded receiving portion. This last variant would be possible if a step or diameter reduction of the internal channel can be accepted in the region of the transition between two sewage pipe elements.

The inner shell 106 is formed from a plastics material, reference being made to the more detailed disclosure of the inner shell of the first embodiment for details. The inner shell 106 comprises a first shell portion 154, which defines the inner wall of the receiving portion 150, a second shell portion 156, which defines the outer wall of the plug-in portion 152, and a third shell portion 158, which defines the inner wall of a pipe portion 159, extending axially between the receiving portion 150 and the plug-in portion 152, of the sewage pipe element. The first shell portion 154, second shell portion 156 and third shell portion 158 may be formed jointly as a single-piece or integral plastics element, for example by an injection moulding method or by a deformation method. The demoulding is then particularly easy to carry out. In the preferred case of the embodiment illustrated in FIG. 2, however, the first shell portion 154 is formed by a receiving sleeve which is separate from the third shell portion 158 and which lines the inner contour of the receiving portion 150. Furthermore, the second shell portion 156 is formed by a plug-in sleeve which is separate from the third shell portion 158 and which lines the outer contour of the plug-in portion 152. The receiving sleeve and plug-in sleeve are placed on the axially opposite ends of the third shell portion 158 and sealed off from the third shell portion 158 in a fluid-tight manner by means of a seal 166.

In the method for manufacturing a sewage pipe element according to the second embodiment, in a first step the outer shell 108 may be provided, into which the inner shell 106 is inserted concentrically in such a way that the cylinder axes A of the outer shell 108 and inner shell 106 coincide and point vertically upwards. The third shell portion 158 is preferably statically self-supporting, in such a way that it can stand on the base 168 of the mould 102 and requires little or no static bracing. The plug-in sleeve 156 is also positioned on the base 168, and the outermost circumferential edge 162 thereof touches an inner wall 164 of the outer shell 108. The axially lower end of the mould cavity 110 is thus defined U-shaped in cross section by the third shell portion 158, the second shell portion 156 and the outer shell 108. Preferably, the second shell portion 156 is U-shaped or L-shaped in cross section.

Subsequently, a concrete 170 can be poured into the cavity 110 between the inner shell 106 and outer shell 108 from above, until the mould cavity 110 is completely filled. The pouring may in particular take place through a circumferential gap or a radial space 160 between the first shell portion 154 and the outer shell 108. By contrast with the lower axial end of the mould 102, at the upper end a distance may be provided between the first shell portion 154 and the outer shell 108, since in this region plastics lining is not absolutely necessary.

After the concrete 170 has partially set or completely set, in a further method step, the outer shell 108 is finally removed, for example by opening the outer shell 108 in a radial direction until the outer shell 108 is completely demoulded. By contrast, the inner shell 106, including the three shell portions 154, 156 and 158, remains rigidly in contact with the concrete 170, and forms the desired plastics lining of the sewage pipe element, which not only extends over the central pipe portion 159, but additionally lines the receiving portion 150 and the plug-in portion 152 substantially completely with plastics material, in such a way that all portions of the sewage pipe element which can come into contact with liquid carried in the channel or which can come into abutting contact with an adjacent sewage pipe element are substantially completely lined with plastics material.

After the sewage pipe element is manufactured, a new inner shell 106 can be inserted into the outer shell 108, and the mould 102 is prepared for manufacturing a new sewage pipe element.

The invention claimed is:

1. A method for manufacturing a sewage pipe element comprising a plastics lining, wherein the method comprises the following steps:
   providing a mould comprising an outer shell and an inner shell, a mould cavity defined between the outer shell and the inner shell, the mould defining a cylindrical sewage pipe element which has a receiving portion at one axial end and a plug-in portion at the opposite axial end, and wherein an internal cross section dimension of the receiving portion is greater than or equal to an external cross section dimension of the plug-in portion, in such a way that for axially coupling two adjacent sewage pipe elements the plug-in portion of one sewage pipe element can be inserted so as to fit into the receiving portion of the adjacent sewage pipe element, the inner shell being formed from plastics material and comprising:
   a first shell portion which defines an inner wall of the receiving portion;
   a second shell portion which defines an outer wall of the plug-in portion; and
   a third shell portion which defines an inner wall of a pipe portion, third shell portion extending axially between the receiving portion and the plug-in portion of the sewage pipe element;
   introducing a concrete into the mould; and,
   demoulding the outer shell;
   wherein, in the step of providing the mould, the inner shell is positioned in line with a vertical cylinder axis, the receiving portion facing upwards; and
   wherein, in the step of introducing the concrete into the mould, the concrete is introduced into the mould cavity through a radial space between the first shell portion and the outer shell; and
   wherein the inner shell remains connected to the concrete after the concrete sets and forms the plastics lining of the finished sewage pipe element.

2. The method of claim 1, wherein the third shell portion is a statically self-supporting pipe portion.

3. The method of claim 1, wherein the first shell portion is formed by a receiving sleeve separate from the third shell portion and/or the second shell portion is formed by a plug-in sleeve separate from the third shell portion, the receiving sleeve and the plug-in sleeve each being attached to an associated axial end of the third shell portion in a fluid-tight manner.

4. The method of claim 1, wherein a radially outermost circumferential edge of the second shell portion touches the outer shell, such that the radially outermost circumferential edge is positioned against a cylindrical inner wall of the outer shell.

5. A device for manufacturing a sewage pipe element comprising a plastics lining, comprising:
   a mould that comprises an outer shell and an inner shell, wherein the inner shell is arranged in line with a vertical cylinder axis concentrically inside the outer shell,
   wherein a mould cavity is defined between the outer shell and the inner shell;
   wherein the mould defines a cylindrical sewage pipe element which has a receiving portion at one axial end and a plug-in portion at the opposite axial end, wherein the receiving portion faces upwards,
   wherein an internal cross section dimension of the receiving portion is greater than or equal to an external cross section dimension of the plug-in portion, in such a way that, for axially coupling two adjacent sewage pipe elements, the plug-in portion of one sewage pipe element can be inserted so as to fit into the receiving portion of the adjacent sewage pipe element, and
   wherein the inner shell is formed from plastics material and comprises:
   a first shell portion which defines an inner wall of the receiving portion;
   a second shell portion which defines an outer wall of the plug-in portion; and
   a third shell portion which defines an inner wall of a pipe portion, the third shell portion extending axially between the receiving portion and the plug-in portion of the sewage pipe element; and
   wherein the plastics material of the inner shell forms the plastics lining of the sewage pipe element.

6. The device of claim 5, wherein the third shell portion is a statically self-supporting pipe portion.

7. The device of claim 5, wherein the first shell portion is formed by a receiving sleeve separate from the third shell portion and/or the second shell portion is formed by a plug-in sleeve separate from the third shell portion, the receiving sleeve and the plug-in sleeve each being attached to an associated axial end of the shell portion in a fluid-tight manner.

8. The device of claim 5, wherein a radially outermost circumferential edge of the second shell portion touches the outer shell such that the radially outermost circumferential edge of the second portion is positioned against a cylindrical inner wall of the outer shell.

\* \* \* \* \*